J. F. FIERKE.
AXLE ASSEMBLY.
APPLICATION FILED APR. 29, 1918.
1,367,869.
Patented Feb. 8, 1921.
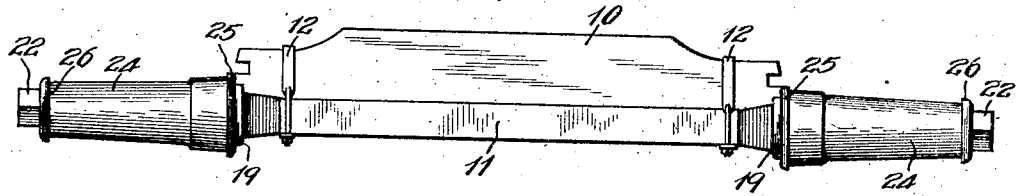
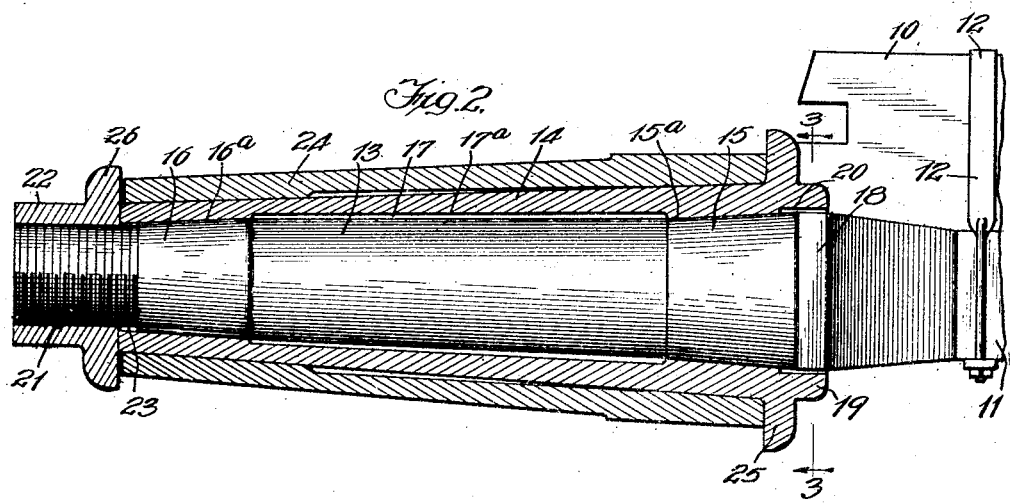
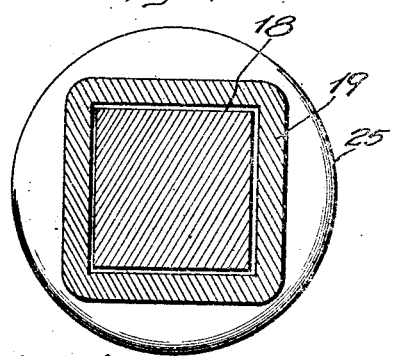
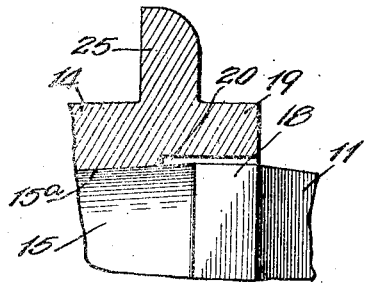
Witnesses:
W. F. Kilroy
Harry P. L. White
Inventor:
John F. Fierke
By Barnett & Truman
Attys.

UNITED STATES PATENT OFFICE.

JOHN F. FIERKE, OF CARPENTERSVILLE, ILLINOIS, ASSIGNOR TO ILLINOIS IRON & BOLT COMPANY, OF CARPENTERSVILLE, ILLINOIS, A CORPORATION OF ILLINOIS.

AXLE-ASSEMBLY.

1,367,869. Specification of Letters Patent. Patented Feb. 8, 1921.

Application filed April 29, 1918. Serial No. 231,399.

*To all whom it may concern:*

Be it known that I, JOHN F. FIERKE, a citizen of the United States, residing at Carpentersville, in the county of Kane and State of Illinois, have invented certain new and useful Improvements in Axle-Assemblies, of which the following is a specification.

My invention relates to an axle assembly for a wagon or other vehicle, and more particularly to a structure in which the axle is made of metal and which comprises a skein providing a bearing for the boxing of the wheel associated with said axle; and a primary object of the invention is to provide a construction of the axle spindle, so-called, and the skein whereby the axle and skein may be given maximum effective strength with a minimum weight of metal by enlargement at the place of greatest stress and a tight fit effected between the skein and the spindle.

A further object is to construct these parts so that any looseness which may develop due to wear can be taken up.

The invention consists of the new and improved constructions, arrangements and devices to be hereinafter described and claimed for carrying out the above stated objects and such other incidental objects as may appear from the following description of a preferred embodiment of the invention. This embodiment of the invention is illustrated in the accompanying drawing, wherein—

Figure 1 is a view, in elevation, of an axle assembly in accordance with my invention, the axle being shown as clamped to a wagon bolster.

Fig. 2 is a longitudinal sectional view of one of the axle spindles with the skein and wheel hub boxing and associated parts.

Fig. 3 is a cross sectional view on line 3—3 of Fig. 2.

Fig. 4 is a detail longitudinal section showing the inner end of the axle spindle and the corresponding portion of the skein.

Like characters of reference designate like parts in the several figures of the drawing.

Referring to the drawing, 10 indicates a wagon bolster and 11 an axle, the body portion of which is preferably square in cross section. The axle is secured to the bolster by any suitable means, for example, by means of the U-bolts 12. The axle is formed at each end with a spindle, as it is commonly called, designated 13, on which fits the skein 14. The axle spindle is formed with a pair of conical surfaces 15 and 16 at opposite ends thereof which have a common axis and the same degree of angularity, but converge to different points on their axis. In other words, one surface would not, if developed, be continuous with the other surface. The intervening surface 17 of the spindle is also tapered preferably, although not necessarily, but if so, its angularity is less than that of surfaces 15 and 16. The skein 14 is formed with interior surfaces 15$^a$, 16$^a$, corresponding in contour to surfaces 15 and 16 of the spindle. The intervening portion of the skein is preferably cut away so that the surface 17$^a$ of the skein does not come into contact with the surface 17 of the spindle between the cones 15 and 16.

At the inner end of the spindle, means are provided for preventing rotation of the skein on the spindle. For example, the spindle is formed with a portion 18, square in cross-section, and the skein with a socket portion 19 of similar configuration, the latter being somewhat deeper than the squared portion 18 of the axle to allow a clearance, indicated at 20, which will make it possible to give the skein a drive fit on the conical surfaces 15, 16 of the spindle.

The outer end of the spindle is provided with take-up means for holding the skein in place on the spindle and for taking up any looseness that may result from wear. The spindle terminates in a threaded portion 21 adapted to receive a nut 22 which bears against the end of the skein. A clearance, indicated at 23, is provided to permit the take up referred to. The hub boxing is indicated at 24, and is held between a flange 25 on the skein and a flange 26 on nut 22. The nut 22 is, in fact, a standard nut of the kind used for holding the hub on the axle skein in wagons having wooden axles, this nut, in my assembly, serving the double purpose of holding the skein in place on the spindle and the wheel in place on the skein.

By forming the axle spindle and skein with the two pairs of co-engaging conical surfaces as described, the axle spindle may be enlarged at its inner end, where the axle is subjected to the greatest strain, without corresponding enlargement at other places subject to less strain. Consequently the construction is strong and at the same time light in weight, and economical of metal. Moreover, by making the angle of the cone relatively steep, a tighter and more durable fit is obtained between the skein and the spindle and one requiring less longitudinal movement of the spindle to take up wear if wear occurs. It will be seen that the angularity or taper of surfaces 15 and 16 can be made much greater when they are spaced apart than if one of these surfaces were on the same cone with the other; that is to say, converging to the same point on the common axis as the other.

I claim:

1. In an axle assembly, the combination of an axle and a skein, each formed with a pair of conical bearing surfaces, adapted to have a wedging fit with the corresponding surfaces of the other, said conical bearing surfaces having a common axis and the same angularity but converging toward different points on said axis, and means for effecting a tight wedging engagement of the bearing surfaces of the skein with those on the axle.

2. In an axle assembly, the combination of an axle comprising a body portion, square in cross section for attachment to the vehicle, and a spindle portion; a skein; the spindle and skein each being formed, near opposite ends thereof, with conical surfaces converging to different points for wedging engagement with the corresponding surfaces on the other, and with an intervening non-wedging surface, the maximum diameter of the conical portion of the spindle at its inner end being greater than the perpendicular distance between opposite sides of the body portion of the axle; and means for effecting a wedging engagement between the bearing surfaces on the skein and those on the axle.

3. In an axle assembly, the combination of an axle comprising a body portion for attachment to the vehicle and a spindle portion; a skein; the spindle and skein each being formed, near opposite ends thereof, with wedging surfaces for wedging engagement with the corresponding surfaces on the other, those at one end of the axle and skein converging to a different point from those at the other, and with an intervening, non-wedging surface, the maximum cross sectional area of the spindle at its inner end being greater than that of the body portion of said axle; and means for effecting a wedging engagement between the bearing surfaces on the skein and those on the axle.

4. In an axle assembly, the combination of an axle having a spindle formed with conical surfaces at opposite ends thereof concentric and converging toward the outer end of the spindle but to different points on the axis thereof; a skein formed with corresponding conical surfaces adapted to bear upon the conical surfaces of the spindle respectively, all the aforesaid conical surfaces being tapered gradually to make the frictional hold of the skein on the spindle effective and said surfaces constituting the only surfaces having wedging contact between said skein and axle; and take-up means for forcing and holding the skein on the spindle.

JOHN F. FIERKE.